United States Patent Office 3,259,605
Patented July 5, 1966

3,259,605
COPOLYMERIZATES OF p-ISOPROPENYLPHENYL ESTERS
Heinrich Krimm, Krefeld-Bockum, and Hermann Schnell, Krefeld-Uerdingen, Germany, assignors to Farbenfabriken Bayer Aktiengesellschaft, Leverkusen, Germany, a German corporation
No Drawing. Filed Nov. 27, 1962, Ser. No. 240,402
Claims priority, application Germany, Dec. 9, 1961, F 35,514
7 Claims. (Cl. 260—47)

The present invention is concerned with new copolymerizates and with the production thereof.

The new copolymerizates of the present invention are, more particularly, copolymerization products of p-isopropenylphenyl esters with copolymerizable compounds. The polymerization can be initiated by heat, irradiation or radical-forming polymerization catalysts.

p-Isopropenylphenyl esters are obtainable by the reaction of p-isopropenyl-phenol with acid chlorides or anhydrides in the presence of inert organic solvents or of water and, possible, inert organic solvents immiscible with water and in the presence of acid-binding agents in the pH range of at least 4–5 at temperatures below 50° C., preferably below 25° C.

Concerning the p-isopropenylphenyl esters, the kind of the acid radicals thereof is not essential. Therefore, there may be used esters of any inorganic mono- and poly-basic acids which are capable to form phenyl esters, for instance, esters of sulphuric acid, sulphonic acid, nitric acid, phosphoric acids, phosphonic acids, arsenic acid, boric acid, carbonic acid, low and higher fatty acids, such as acetic acid, propionic acid, butyric acid, isobutyric acid, oleic and linoleic acid, dicarboxylic acids, such as oxylic acid, succinic acid, adipic acid, sebacic acid, unsaturated acids, such as maleic acid, fumaric acid, itaconic acid, polybasic acids, such as mellitic acid, aromatic acids, such as benzoic acid, phthalic acid, isophthalic acid, terephthalic acid, tetrachlorophthalic acid, and so on.

As special examples of p-isopropenylphenyl esters, there may be mentioned:

Tri-(p-isopropenylphenyl)-phosphate,
Tri-(p-isopropenylphenyl)-phosphite,
Tri-(p-isopropenylphenyl)-borate,
Di-(p-isopropenylphenyl)-phosphite,
Di-(p-isopropenylphenyl)-carbonate,
p-Isopropenylphenyl-chloroformic acid ester,
2,2-(4,4'-dihydroxydiphenyl)-propane-bis-(p-isopropenylphenyl)-carbonate,
p-Isopropenylphenyl-acetate,
p-Isopropenylphenylbutyrate,
p-Isopropenylphenyl-isobutyrate,
p-Isopropenylphenyl undecylenate,
p-Isopropenylphenyl stearate,
p-Isopropenylphenyl oleate,
p-Isopropenylphenyl linoleate,
p-Isopropenylphenyl linolenate,
p-Isopropenylphenyl benzoate,
Di-(p-isopropenylphenyl)-oxalate,
Di-(p-isopropenylphenyl)-succinate,
Di-(p-isopropenylphenyl)-maleate,
Di-(p-isopropenylphenyl)-fumarate,
Di-(p-isopropenylphenyl)-adipate,
Di-(p-isopropenylphenyl)-sebacate,
Di-(p-isopropenylphenyl)-phthalate,
Di-(p-isopropenylphenyl)-isophthalate,
Di-(p-isopropenylphenyl)-terephthalate,
Di-(p-isopropenylphenyl)-tetrachlorophthalate,
Tri-(p-isopropenylphenyl)-cyanurate, and
Di-(p-isopropenylphenyl)-hexachloroendomethylene-tetrahydrophthalate.

For copolymerization with p-isopropenylphenyl esters there may be used, for example, the following copolymerizable compounds: vinyl compounds, such as styrene, $\alpha$-methyl styrene, chlorostyrenes, acrylonitrile, methacrylonitrile, acrylic acid esters, methacrylic esters, acrylamide, methyl vinyl ketone, methyl vinyl ether, vinyl acetate, vinyl chloride and vinylidene chloride; maleic acid or fumaric acid derivatives, such as maleic anhydride, maleic acid semi esters, maleic acid dimethyl ester and maleic acid diethyl ester; as well as unsaturated polyesters which contain maleic acid or fumaric acid as important components.

The ratio of the two starting components can be varied within wide limits.

Radical-forming polymerization catalysts are, for example, acetyl peroxide, benozyl peroxide, lauroyl peroxide, tertiary-butyl peroxide, methyl ethyl ketone hydroperoxide, cyclohexanone hydroperoxide, tertiary-butyl hydroperoxide, di-tertiary-butyl diperphthalate, tertiary-butyl-perbenzoate, peracetic acid, hydrogen peroxide, potassium and ammonium persulphate and azodiisobutyric acid nitrile.

Cold-hardening systems, such as cobaltous salt/methyl ethyl ketone hydroperoxide and dimethylaniline/diacylperoxides, may also be used as catalysts. Furthermore, light and energy-rich irradiations are also effective polymerization initiators.

The polymerization technique depends, in the first place, on the nature of the copolymerizates to be produced. If these are soluble and meltable, apart from the mass polymerization, it is also possible to use solution, dispersion or emulsion polymerization. If the copolymerizates are insoluble and non-meltable, it is advantageous to use mass-polymerization.

Since the p-isopropenylphenyl esters can be obtained in high purity by distillation or recrystallization, the production of water-white and glass clear copolymerizates is a particularly noticeable advantage of the present process.

A further advantage is the thermostability of the copolymerizates which depends upon the fact that the ester bond of the p-isopropenylester is stable up to high temperatures. This thermostability is of special practical use when the copolymerizates are strongly cross-linked by the use of polyfunctional p-isopropenylphenyl esters.

Furthermore, the properties of the new copolymerizates depend upon the nature and composition of the components. Since these can be varied within wide limits, there is thus available a considerable breadth of variation of interesting synthetic resins.

If, for example, styrene, as vinyl monomer, is copolymerized with di-(p-isopropenylphenyl)-carbonate or tri-(p-isopropenylphenyl)-phosphate, then there are obtained highly cross-linked copolymerizates with outstanding water-stability, high temperature stability and outstanding electrical properties over a wide temperature range.

The new copolymerizates are synthetic resins or, insofar as they are soluble, also intermediates for the production and modification of synthetic resins or lacquer raw materials.

If desired, strengthening and filling agents, such as quartz powder, glass fibres, asbestos or metal powders can be incorporated, as well as pigments, dyestuffs and plasticizers.

The following examples are given for the purpose of illustrating the present invention:

*Example 1*

A solution of 13 grams tri-(isopropenylphenyl)-phosphate, 117 grams styrene and 325 milligrams azodiisobutyric acid nitrile is heated to 60° C. between 2 glass plates rubbed with zinc stearate. After two hours, the solution has gelled. After 8 hours, the hard copolymerizate is removed and hardened overnight at 100° C. The copolymerizate is glass-clear, water-white, insoluble and non-meltable. It possesses outstanding mechanical properties and a Martens heat stability of 98° C.

*Example 2*

A solution of 20 grams tri-(p-isopropenylphenyl)-phosphate, 10 grams acrylic acid nitrile, 100 milligrams methyl ethyl ketone peroxide and 12 milligrams cobalt naphthenate gel at room temperature after standing for 1 hour. After 15 hours, a clear, hard and non-meltable polymer results.

*Example 3*

A solution of 20 grams tri-(p-isopropenylphenyl)-phosphate, 60 grams styrene, 400 milligrams benzoyl peroxide and 2 drops dimethylaniline harden at room temperature after 24 hours to give a hard, clear, insoluble and non-meltable copolymerizate with outstanding stability.

*Example 4*

A solution of 43 grams di-(p-isopropenylphenyl)-carbonate, 87 grams styrene and 325 milligrams azodiisobutyric acid nitrile is heated to 60° C. for 20 hours in a water bath between 2 glass plates rubbed with talc. After a further 15 hours heating at 100° C., there is obtained a glass-clear, water-white, insoluble and non-meltable copolymerizate with outstanding mechanical properties and a Martens heat stability of 128° C.

*Example 5*

A solution of 30 grams di-(p-isopropenylphenyl)-carbonate, 30 grams acrylic acid nitrile and 200 milligrams benzoyl peroxide is heated at 80° C. After 1 hour, gelling sets in. After a further 5 hours, there is obtained a hard, clear, insoluble and non-meltable copolymerizate.

*Example 6*

A solution of 15 grams di-(p-isopropenylphenyl)-carbonate, 15 grams acrylonitrile, 300 milligrams benzoyl peroxide and 3 drops dimethylaniline gels after 1 hour. After 15 hours, a clear, hard and non-meltable copolymerizate results.

*Example 7*

A solution of 6.5 grams 2,2-(4,4'-dihydroxydiphenyl)-propane-bis-(p-isopropenylphenyl-carbonate), 123.5 grams styrene and 400 milligrams azodiisobutyric acid nitrile is maintained at 60° C. for 20 hours in a water bath between 2 glass plates which are lightly greased with silicone grease and hardened for a further 15 hours at 100° C. The finished copolymerizate is glass clear, colourless, insoluble and unmeltable. It possesses good mechanical properties and a Martens degree of 85° C.

*Example 8*

A solution of 25 grams di-(p-isopropenylphenyl)-adipate, 100 grams styrene and 312 milligrams azodiisobutyric acid nitrile is maintained at 100° C. for 20 hours between two glass plates rubbed with zinc stearate and hardened for a further 15 hours. The copolymerizate is glass-clear, water-white, insoluble and non-meltable. It possesses good mechanical properties and a Martens degree of 97° C.

*Example 9*

A solution of 6.6 grams di-(p-isopropenylphenyl)-fumarate, 125 grams styrene and 325 milligrams azodiisobutyric acid nitrile is maintained at 60° C. for 20 hours between two glass plates and hardened at 100° C. for 15 hours. There is obtained a water-white, glass-clear, insoluble and non-meltable copolymerizate with outstanding mechanical properties.

*Example 10*

A solution of 4 grams di-(p-isopropenylphenyl)-fumarate, 16 grams methacrylic acid methyl ester and 50 milligrams azodiisobutyric acid nitrile is heated to 90° C. After 25 minutes, gelling sets in. After 4 hours, there is obtained a glass-clear, water-white, hard copolymerizate with outstanding mechanical properties.

*Example 11*

A solution of 1 gram di-(p-isopropenylphenyl)-terephthalate, 19 grams styrene and 100 milligrams azodiisobutyric acid nitrile is heated to 135° C. in an oil bath. After 7 minutes, gelling sets in and after 5 hours there is obtained a clear, water-white, hard and non-meltable copolymerizate.

*Example 12*

A solution of 4 grams 2,2-(4,4'-dihydroxydiphenyl)-propane-bis-(p-isopropenylphenyl-carbonate), 16 grams acrylic acid methyl ester and 100 milligrams benzoyl peroxide is heated to 100° C. After 1 hour, the solution has gelled and after further 10 hours has hardened. There is obtained a clear, bright, hard and non-meltable copolymerizate.

*Example 13*

A solution of 5 grams p-isopropenylphenylacetate and 15 grams styrene is heated for 15 hours at 140° C. in a thick-walled sealed ampoule. There is obtained a clear, water-white copolymerizate which dissolves clearly in aromatic hydrocarbons.

*Example 14*

A solution of 5 grams tri-(p-isopropenylphenyl)-cyanurate, 45 grams styrene and 200 milligrams di-tertiary-butyl-diperphthalate is maintained at 80° C. for 24 hours and hardened for further 15 hours at 100° C. There is obtained a water-white, glass-clear, insoluble and non-meltable copolymerizate with outstanding mechanical properties.

We claim:

1. Copolymerizates of p-isopropenylphenyl esters and a copolymerizable compound selected from the group consisting of styrene, α-methyl styrene, chloro styrene, acrylonitrile, methacrylonitrile, acrylic acid ester, methacrylic acid ester, acrylamide, methyl vinyl ketone, methyl vinyl ether, vinyl acetate, vinyl chloride, vinylidene chloride, maleic anhydride, maleic acid semi ester, maleic acid dimethyl ester, maleic acid diethyl ester and unsaturated poly esters of maleic or fumaric acid.

2. Copolymerizates according to claim 1 wherein the p-isopropenylphenyl ester is selected from the group consisting of phosphoric, carbonic, adipic, fumaric, terephthalic, acetic and cyanuric ester.

3. The copolymerizate according to claim 1, wherein the p-isopropenylphenyl ester is the triester of the phosphoric acid.

4. The copolymerizate according to claim 1, wherein the p-isopropenylphenyl ester is the diester of carbonic acid.

5. The copolymerizate according to claim 1, wherein the p-isopropenylphenyl ester is the 2,2-(4,4'-dihydroxydiphenyl)-propane-bis-(p-isopropenylphenyl-carbonate).

6. The copolymerizate according to claim 1, wherein the p-isopropenylphenyl ester is the diester of the fumaric acid.

7. The copolymerizate according to claim 1, wherein the p-isopropenylphenyl ester is the diester of the terephthalic acid.

(References on following page)

References Cited by the Examiner

UNITED STATES PATENTS 2,801,262  7/1957  Jacobs et al. _____ 260—626

FOREIGN PATENTS 903,062  9/1962  Great Britain.

OTHER REFERENCES

Corson, J. Organic Chemistry, vol. 23, April 1958, pp. 544–549.

WILLIAM H. SHORT, *Primary Examiner.*

J. C. MARTIN, *Assistant Examiner.*